(12) United States Patent
Bochmann et al.

(10) Patent No.: US 7,041,760 B2
(45) Date of Patent: May 9, 2006

(54) PROCESS FOR PRODUCTION OF BUTYL RUBBER

(75) Inventors: Manfred Bochmann, Norwich (GB); Shaun Garratt, Norwich (GB)

(73) Assignee: Bayer Inc., Sarnia (CA)

( * ) Notice: Subject to any disclaimer, the term of this patent is extended or adjusted under 35 U.S.C. 154(b) by 0 days.

(21) Appl. No.: 10/931,204

(22) Filed: Aug. 31, 2004

(65) Prior Publication Data

US 2005/0070680 A1 Mar. 31, 2005

(30) Foreign Application Priority Data

Sep. 16, 2003 (CA) .................................. 2441079

(51) Int. Cl.
*C08F 4/50* (2006.01)
(52) U.S. Cl. .................... 526/190; 526/339; 526/348.7
(58) Field of Classification Search ................ 526/190, 526/221, 237, 339, 348.7
See application file for complete search history.

(56) References Cited

U.S. PATENT DOCUMENTS

| | | | |
|---|---|---|---|
| 2,358,128 A | 6/1944 | Thomas et al. ................ 260/79 |
| 3,493,549 A * | 2/1970 | Murai et al. ................. 526/131 |
| 3,748,286 A * | 7/1973 | Tanaka et al. .............. 528/414 |
| 3,919,182 A * | 11/1975 | Gaylord ....................... 526/221 |
| 4,943,616 A * | 7/1990 | Mishra et al. ............... 525/264 |
| 5,703,182 A | 12/1997 | Langstein et al. .......... 526/185 |
| 6,008,307 A | 12/1999 | Shaffer ........................ 526/180 |
| 6,291,389 B1 | 9/2001 | Shaffer et al. .............. 502/158 |
| 6,699,938 B1 | 3/2004 | Shaffer ........................ 525/232 |
| 2002/0010083 A1 | 1/2002 | Shaffer et al. .............. 502/155 |

FOREIGN PATENT DOCUMENTS

| | | |
|---|---|---|
| DE | 198 36 663 | 2/2000 |
| WO | 00/04061 | 1/2000 |

OTHER PUBLICATIONS

Ullmanns Encyclopedia of Industrial Chemistry, vol. A 23, 1993, pp. 288-295; Elvers, B. et al "Refractory Ceramics to Silicon Carbide".

Song, X.; Thornton-Pett, M.; Bochmann, M.; Organometallics 1998, 17, 1004-1006 "Synthesis, Structure, and Reactivity of $(C_5H_4SiMe_3)_2Y\{(\mu\text{-}FC_6F_4)(\mu\text{-}Me)B(C_6F_5)_2\}$: Tight Ion Pairing in a Cationic Lanthanide Complex" with supporting document "General Experimental Procedures".

Carr, A.G.; Dawson, D.M.; Bochmann, M.; Macromol. Rapid Commun. 1998, 19, 205-207 "The $[Zr(N\{SiMe_3\}_2)_3]+$ cation as a novel initiator for carbocationic isobutene homo- and isobutene/isoprene co-polymerisations".

* cited by examiner

*Primary Examiner*—Fred Teskin
(74) *Attorney, Agent, or Firm*—Jennifer R. Seng

(57) ABSTRACT

The present invention relates to a process for producing polymers containing repeating units derived from at least one isoolefin monomer, optionally repeating units derived from at least one multiolefin monomer and optionally further copolymerizable monomers in the presence of a zinc compound and optionally an organic halide activator.

6 Claims, No Drawings

PROCESS FOR PRODUCTION OF BUTYL RUBBER

FIELD OF THE INVENTION

The present invention relates to a process for producing polymers containing repeating units derived from at least one isoolefin monomer, optionally repeating units derived from at least one multiolefin monomer and optionally further copolymerizable monomers in the presence of a zinc compound.

BACKGROUND OF THE INVENTION

Butyl rubber is understood to be a copolymer of an isoolefin and one or more, preferably conjugated, multiolefins as comonomers. Commercial butyl comprises a major portion of isoolefin and a minor amount of a conjugated multiolefin. The preferred isoolefin is isobutylene.

Butyl rubber or butyl polymer is generally prepared in a slurry process using methyl chloride as a vehicle and a Friedel-Crafts catalyst as part of the polymerization initiator. The polymerization is generally carried out at temperatures of about −90° C. to −100° C. See U.S. Pat. No. 2,356,128 and *Ullmanns Encyclopedia of Industrial Chemistry*, volume A 23, 1993, pages 288–295. The low polymerization temperatures are required in order to achieve molecular weights which are sufficiently high for rubber applications.

Other compounds that have been found to be active as catalysts for polymerizing isoolefins include organometallics compounds in combination with a cation-generating agent, such as $C_5Me_5TiMe_3/B(C_6F_5)_3$ (WO-00/04061-A1), $Cp_2AlMe/B(C_6F_5)_3$ (U.S. Pat. No. 5,703,182), and combinations of zirconocenes and related complexes with either $B(C_6F_5)_3$ or $CPh_3[B(C_6F_5)_4]$ (WO-95/29940-A1, DE-A1Song, X.; Thornton-Pett, M.; Bochmann, M. *Organometallics* 1998, 17, 1004, Carr, A. G.; Dawson, D. M.; Bochmann, M. *Macromol. Rapid Commun.* 1998, 19, 205.

Zinc compounds have not been used as catalysts for isoalkene polymerizations. Indeed, $ZnCl_2$ in the presence or absence of alkyl halide activators (such as $Me_3CCl$ or MeCOCl) and used either in neat isobutene or in isobutene/methyl chloride mixtures, proves to be inactive, and no polymer is obtained.

SUMMARY OF THE INVENTION

The present invention provides a process for producing polymers containing repeating units derived from at least one isoolefin monomer, optionally repeating units derived from at least one multiolefin monomer and optionally further copolymerizable monomers in the presence of a zinc compound.

The present invention provides a slurry process for producing polymers containing repeating units derived from at least one isoolefin monomer, optionally repeating units derived from at least one multiolefin monomer and optionally further copolymerizable monomers in the presence of a zinc compound.

The present invention also provides method for catalyzing the polymerization of a monomer mixture containing at least one isoolefin monomer, optionally at least one multiolefin monomer and optionally further copolymerizable monomers by addition of a zinc compound.

DETAILED DESCRIPTION OF THE INVENTION

The present invention relates to isoolefin polymers and butyl rubber. The terms "butyl rubber", "butyl polymer" and "butyl rubber polymer" are used throughout this specification interchangeably. While the prior art in using butyl rubber refers to polymers prepared by reacting a monomer mixture comprising a $C_4$ to $C_7$ isomonoolefin monomer and a $C_4$ to $C_{14}$ multiolefin monomer, this invention specifically relates to polymers containing repeating units derived from at least one isoolefin monomer, optionally repeating units derived from at least one multiolefin monomer and optionally further copolymerizable monomers.

The present invention is not limited to a special isoolefin. Isomonoolefins are preferred. Preferably the isoolefin(s) have in the range of from 4 to 16 carbon atoms, in particular 4–7 carbon atoms, such as isobutene, 2-methyl-1-butene, 3-methyl-1-butene, 2-methyl-2-butene, 4-methyl-1-pentene and mixtures thereof. Most preferred is isobutene.

The present invention is not limited to a special multiolefin. Every multiolefin copolymerizable with the isoolefin known by the skilled in the art can be used. However, multiolefins with in the range of from 4–14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof, in particular conjugated dienes, are preferably used. Isoprene is preferably used.

As optional monomers every monomer copolymerizable with the isoolefins and/or dienes known by the skilled in the art can be used. α-methyl styrene, p-methyl styrene, chlorostyrene, cyclopentadiene and methylcyclpentadiene are preferably used. Indene and other styrene derivatives may also be used in this invention.

Preferably, the monomer mixture contains in the range of from 80% to 100% by weight of at least one isoolefin monomer and in the range of from 0% to 20% by weight of at least one multiolefin monomer and in the range of from 0% to 5% by weight of at least one further copolymerizable monomer. More preferably, the monomer mixture contains in the range of from 85% to 99.5% by weight of at least one isoolefin monomer and in the range of from 0.5% to 15% by weight of a multiolefin monomer. Most preferably, the monomer mixture contains in the range of from 95% to 99% by weight of at least one isoolefin monomer and in the range of from 1% to 5% by weight of at least one multiolefin monomer.

The weight average molecular weight, $M_w$, is preferably greater than 100 kg/mol, more preferably greater than 200 kg/mol, most preferably greater than 300 kg/mol. The polymerization is performed in the presence of a zinc compound capable of initiating the polymerization process. The term "zinc compound" denotes a compound of composition $ZnR^1R^2$ comprising a Lewis acidic zinc metal centre bonded to two identical or different $C_1$ to $C_{50}$ hydrocarbon radicals ($R^1$ and $R^2$) which may be linear, branched or cyclic and may contain one or more non-carbon atoms in the carbon-chain at least one of which is electron withdrawing. Preferred ligands $R^1$ and $R^2$ are aryl groups or substituted aryl groups. Most preferably the ligands $R^1$ and $R^2$ are pentafluorophenyl.

The zinc compound may be generated by known methods. For example, it is known in the art that $Zn(C_6F_5)_2$ can be prepared by several methods, including the reaction of $ZnCl_2$ with $C_6F_5MgX$ (Noltes, J. G.; van den Hurk, J. W. G. *J. Organomet. Chem.* 1963, 64, 377), from $AgC_6F_5$ and $ZnI_2$ (Sartori, P.; Weidenbruch, M. *Chem. Ber.* 1967, 100, 3016), by the thermal decarboxylation of $Zn(O_2CC_6F_5)_2$ (Miller, W. T.; Sun, K. K.; *J. Am. Chem. Soc.* 1970, 92, 6985), or by the reaction of $ZnMe_2$ or $ZnEt_2$ with $B(C_6F_5)_3$ (Walker, D. A.; Woodman, T. J.; Hughes, D. L.; Bochmann, M. *Organometallics* 2001, 20, 3772). It may be advantageous to stabilize the zinc compound with at least one neutral ligand such as toluene, xylene, hexamethylbenzene and the like.

According to the present invention, the compound $Zn(C_6F_5)_2$·toluene can be synthesized by the exchange reaction of $ZnR_2$ (R=Me or Et) with $B(C_6F_5)_3$ in toluene.

Also according to the present invention, the zinc compound may be the only catalyst/initiator present in the monomer mixture.

The preferred ratio of zinconocene to monomer(s) is in the range of from $1:10^6$ to $1:10^2$ by mol, and the most preferred ratio is in the range of from $1:10^3$ and $1:10^4$.

It might be advantageous to further add co-catalyst(s) to the monomer mixture. The present invention is not limited to any special co-catalyst/activator as long as the co-catalytic compound does not adversely affect the polymerization reaction. Preferred are activators of the general formula $R_3CX$ (I) or RCOX (II) with each R independently being a $C_1$ to $C_{50}$ hydrocarbon radical which may be linear, branched or cyclic and may contain one or more non-carbon atoms in the carbon-chain, such as methyl, ethyl, n-propyl, n-propyl, n-butyl, s-butyl, t-butyl, pentyl, hexyl, octyl, nonyl, decyl, dodecyl, 3-methylpentyl and 3,5,5-trimethylhexyl and each X being a halogen, preferably chlorine or bromine. Most preferred co-catalysts are $Me_3CCl$, $MeCOCl$, and $Me_3CBr$.

The preferred ratio of zinc compound to co-catalyst(s) is in the range of from 1:0.1 to 1:10 by mol, and the most preferred ratio is in the range of from 1:1 to 1:3.

According to the present invention, the polymerization can be preferably performed in a continuous process in slurry (suspension), in a suitable inert diluent. Inert diluents known to the person skilled in the art for butyl polymerization may be considered as the diluents (reaction medium). These comprise alkanes, chloroalkanes, cycloalkanes or aromatics, which are frequently also mono- or polysubstituted with halogens. Hexane/chloroalkane mixtures such as hexane/dichloromethane, dichloromethane or methyl chloride itself are mentioned in particular. The preferred diluent is methyl chloride.

According to the present invention, the polymerization can be preferably performed in the absence of a diluent in bulk. More preferably, the polymerization is performed in liquid/liquefied monomer(s).

The monomers are preferably polymerized at temperatures in the range from $-120°$ C. to $+20°$ C., more preferably in the range from $-100°$ C. to $-20°$ C., and pressures in the range from 0.1 to 4 bar.

The use of a continuous reactor as opposed to a batch reactor may have a positive effect on the process. Preferably, the process is conducted in at least one continuous reactor having a volume of between 0.1 m³ and 100 m³, more preferable between 1 m³ and 10 m³.

If polymerization is performed continuously, the process is preferably performed with the following three feed streams:
  I) solvent/diluent+isoolefin (preferably isobutene)+multiolefin (if present, preferably diene, isoprene)
  II) zinc compound
  III) organic halide activator (if present)

Polymers containing residual double bonds resulting from the inventive process may be the starting material for a halogenation process in order to produce halo-butyl polymers. Bromination or chlorination can be performed according to the procedures described in Rubber Technology, $3^{rd}$ Ed., Edited by Maurice Morton, Kluwer Academic Publishers, pp. 297–300 and references cited within this reference.

The copolymers presented in the present invention are ideally suitable for the production of moldings of all kinds, in particular tire components and industrial rubber articles, such as bungs, damping elements, profiles, films, coatings. The polymers are used to this end in pure form or as a mixture with other rubbers, such as NR, BR, HNBR, NBR, SBR, EPDM or fluororubbers. The preparation of these compounds is known to those skilled in the art. In most cases carbon black is added as filler and a sulfur based curing system is used. For the compounding and vulcanization it is referred to Encyclopedia of Polymer Science and Engineering, Vol. 4, S. 66 et seq. (Compounding) and Vol. 17, S. 666 et seq. (Vulcanization).

The vulcanization of the compounds is usually effected at temperatures in the range of 100 to 200° C., preferred 130 to 180° C. (optionally under pressure in the range of 10 to 200 bar).

The following Examples are provided to illustrate the present invention:

EXAMPLES

Equipment

Isoprene content was determined through $^1H$ NMR spectroscopy with the use of a Bruker 300 MHz NMR Spectrometer. NMR samples used to determine isoprene content were prepared in $CDCl_3$. Microstructure information was calculated with the use of previously established integration methods. Chemical shifts were referenced to a TMS internal standard.

GPC analysis was performed in tetrahydrofuran at 25° C. with the use of a Polymer Lab GPC-220 gel permeation chromatograph equipped with a dual refractive index and PD2040 dual-angle light scattering detector and PL gel 2× mixed bed-B, 30 cm, 10 micron columns.

Polymer gel content was determined through conventional gravimetric analysis of the dry, hydrocarbon-insoluble fraction (insoluble in boiling cyclohexane, under agitation for a period of 60 minutes)

Chemicals

Isobutene was obtained from BOC and dried by passing through 10 percent weight sodium on aluminum oxide and 4A molecular sieves.

Isoprene was obtained from Aldrich and purified by distillation from a sodium mirror under nitrogen prior to use t-Butyl chloride was obtained from Aldrich and purified by distillation from calcium hydride under nitrogen prior to use.

Acetyl chloride was obtained from Aldrich and used as received.

Dichloromethane was obtained from Riedel-de-Haën (high purity grade) and purified by distillation from calcium hydride under nitrogen prior to use.

$Zn(C_6F_5)_2$·toluene was synthesized by the exchange reaction of $ZnMe_2$ with $B(C_6F_5)_3$ in toluene. A solution of $B(C_6F_5)_3$(3.01 g, 5.88 mmol) in toluene (50 mL) was treated with a solution of $ZnMe_2$ in toluene (4.41 mL, 8.82 mmol, 2M) at room temperature. The mixture was stirred for 30 minutes. Removal of volatiles left a white solid which was recrystallized from light petroleum (60 mL) at −20° C. overnight to give $Zn(C_6F_5)_2$.toluene as needle-like crystals, yield 3.33 g (76.6%). Anal. Calcd. for $C_{12}F_{10}Zn.C_7H_8$: C, 46.42; H, 1.64. Found: C, 45.93; H, 1.46. $^1H$ NMR (300 MHz, 25° C., $C_6D_6$): δ6.98–7.13 (m, 5 H, Ph), 2.10 (s, 3H, Me). $^{19}F(C_6D_6)$: δ−118.3 (m, 4 F, o-F), −152.9 (t, 2 F, $J_{FF}$=19.8 Hz, p-F), −160.9 (m, 4 F, m-F).

Example 1

Into a 250 mL 3-necked reaction flask, equipped with a magnetic follower and cooled to −78° C. with a dry ice/acetone bath, was condensed 97 mL of isobutene. 3 mL of isoprene and a solution of $Me_3CCl$ (18.5 mg, 0.2 mmol) in dichloromethane (2 mL) were added to the reactor vessel and then the mixture was allowed to equilibrate at −78° C.

$Zn(C_6F_5)_2$.toluene (98 mg, 0.2 mmol) was dissolved in 2 mL of dichloromethane and then transferred by syringe into the rapidly stirred (1000rpm) mixture.

After 30 min. the reaction was terminated by addition of methanol (10mL). The polymer was precipitated with 200 mL methanol, filtered and dried at 50° C. to constant weight. The yield was 4.5 g, $M_n$=581,000 and $M_w$=1,306,000, with 2.7 mol-% isoprene content and the gel quota of 1.5%.

Example 2

Into a 250 mL 3-necked reaction flask, equipped with a magnetic follower and cooled to −78° C. with a dry ice/acetone bath, was condensed 95 mL of dry isobutene. 5 mL of isoprene and a solution of $Me_3CCl$ (27.8 mg, 0.3 mmol) in dichloromethane (2 mL) were added to the reactor vessel. The mixture was stirred rapidly at −78° C., and 148 mg (0.3 mmol) of $Zn(C_6F_5)_2$.toluene in 3 mL of dichloromethane were added. After 30 min. the reaction was terminated by addition of methanol (10 mL). The polymer precipitated with 200 mL methanol and dried at 50° C. to constant weight.

The yield of copolymer was 3.8 g, $M_n$=226,000 and $M_w$=661,000, with an isoprene content of 4.7 mol-% and a gel quota of 1.0%.

Example 3

The methodology of Example 2 was repeated, except that 93 mL of isobutene and 7 mL of isoprene were used. The yield of copolymer was 4.0 g, $M_n$=302,000 and $M_w$=782,000. The isoprene content was 6.4 mol-% and the gel quota 3.8%.

Example 4

The methodology of Example 2 was repeated, except that 90 mL of isobutene and 10 mL of isoprene were used and the reaction time was 60 minutes. The polymer yield was 3.2 g, $M_n$=236,000 and $M_w$=592,000. The isoprene content was 9.0 mol-% and the gel quota 4.6%.

Example 5

The methodology of Example 2 was repeated, except that $Me_3CBr$ (41.1 mg, 0.3 mmol) was used instead of $Me_3CCl$. The reaction was left for 20 minutes. The polymer yield was 4.4 g, $M_n$=192,000 and $M_w$=359,000. The isoprene content was 5.1 mol-%.

Example 6

Into a 250 mL 3-necked flask, equipped with a magnetic follower and cooled to −78° C. with a dry ice/acetone bath, was condensed 70 mL of methyl chloride and 30 mL of isobutene. 1.5 mL of isoprene and a solution of $Me_3CCl$ (27.8 mg, 0.3 mmol) in dichloromethane (2 mL) were added to the reactor vessel and the mixture was allowed to equilibrate at −78° C. A solution of 148 mg (0.3mmol) of $Zn(C_6F_5)_2$.toluene in 3 mL of dichloromethane was injected into the rapidly stirred mixture. After 20 min. the reaction was terminated by addition of methanol (10 mL). The polymer was precipitated with 20 mL of methanol, filtered and dried in at 50° C. to constant weight. The yield was 1.7 g, $M_n$=225,000 and $M_w$=405,000, with an isoprene content of 3.0 mol-% and a gel quota of 0.6%.

Example 7

The methodology of Example 6 was repeated, except that 2.1 mL of isoprene was used. The yield of copolymer was 1.5 g, $M_n$=100,000 and $M_w$=241,000, with an isoprene content of 4.0 mol-% and a gel quota of 0.6%.

Example 8

The methodology of Example 6 was repeated, except that 3.0 mL of isoprene was used. The polymer yield 0.8 g, $M_n$=82,500 and $M_w$=198,000. The isoprene content was 5.2 mol-% and the gel quota 0.6%.

Example 9

The methodology of Example 6 was repeated, except that 3.0 mL of isoprene and 55.6 mg (0.6 mmol) of $Me_3CCl$ were used. The polymer yield was 1.0 g, $M_n$=60,700 and $M_w$=288,000, with an isoprene content of 5.7 mol-%.

Example 10

Into a 250 mL 3-necked reaction flask, equipped with a magnetic follower and cooled to −78° C. with a dry ice/acetone bath, were condensed 70 mL of methyl chloride and 30 mL of isobutene. 3.0 mL of isoprene and a solution of $Me_3CBr$ (82.2 mg, 0.6 mmol) in dichloromethane (2 mL) were added and the mixture was allowed to equilibrate at −78° C. A solution of 148 mg (0.3 mmol) of $Zn(C_6F_5)_2$.toluene in 3 mL of dichloromethane was then transferred to the rapidly stirred mixture. The reaction was terminated after 30 minutes. The polymer was precipitated with 200 mL of methanol, filtered and dried at 50° C. to constant weight. The yield was 1.5 g, $M_n$=194,000 and $M_w$=612,000, with an isoprene content of 5.2 mol-%.

Example 11

The methodology of Example 10 was repeated, except that 5.0 mL of isoprene was used. The yield of copolymer was 1.2 g, $M_n$=215,000 and $M_w$=1,014,000. The isoprene content was 6.7 mol-%.

Example 12

Following the procedure of Example 2, 2 mL 1,3-pentadiene and 1.5 mmol $Me_3CBr$ in 2 mL dichloromethane were added to 100 mL isobutene at −78° C. To this rapidly stirred mixture was added a solution of 0.3 mmol $Zn(C_6F_5)_2$.toluene in 3 mL of dichloromethane. The reaction was terminated after 30 min, the polymer was precipitated and dried to give a yield of 5.9 g, $M_n$=100,000 and $M_w$=199,000. The pentadiene content was 2.5 mol-%.

Example 13

The procedure of Example 12 was followed, except that 4 mL of 1,3-pentadiene were added. The polymer yield was 3.4 g, $M_n$=102,000 and $M_w$=172,000. The pentadiene content was 5.6 mol-%.

Examples 1–4 illustrate that the zinc compound, $Zn(C_6F_5)_2$.toluene, in combination with $Me_3CCl$ is an activate initiating system for the production of butyl rubber in an essentially solvent free system. Examples 1–4 also illustrate that with varying levels of isoprene in the feed a product with high levels of incorporated into the polymer can be made with a high molecular weight while maintaining a low level of gel.

Example 5 illustrates that $Me_3CBr$ can be used as a co-catalyst as well as $Me_3CCl$ for the production of butyl rubber.

Examples 6–9 illustrated that the zinc compound, $Zn(C_6F_5)_2$.toluene, in combination with $Me_3CCl$ can also be used to prepare high molecular weight butyl rubber in a solvent based system. The examples here using the industrially relevant MeCl as a solvent of choice. Taken in combination with examples 1–4 the utility of the system is illustrated, i.e. being able to produce a desirable product with or without the need for solvent.

Examples 10 and 11 show that it is possible to utilize $Me_3CBr$ in the presence of a solvent and produce high molecular weight product.

Examples 12 and 13 show that the zinc compound, $Zn(C_6F_5)_2$.toluene, in combination with $Me_3CCl$ can not only polymerize isobutene and isoprene but isobutene and 1,3-pentadiene to produce a high molecular weight product.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing polymers comprising repeating units derived from at least one isoolefin monomer, optionally repeating units derived from at least one multiolefin monomer and optionally further copolymerizable monomers comprising polymerizing at least one isoolefin monomer, optionally repeating units derived from at least one multiolefin monomer and optionally further copolymerizable monomers in the presence of a zinc compound wherein the zinc compound comprises a Lewis acidic zinc metal centre bonded to two identical or different $C_1$ to $C_{50}$ hydrocarbon radicals which may be linear, branched or cyclic and may contain one or more non-carbon atoms in the carbon-chain at least one of which is electron withdrawing.

2. A process according to claim 1, wherein the zinc compound comprises aryl groups or substituted aryl groups.

3. A process according to claim 1, wherein said isoolefin monomer is isobutene.

4. A process according to claim 1, wherein the process is conducted in the presence of at least one activator of the general formula $R_3CX$ (I) or RCOX (II) with each R independently being a $C_1$ to $C_{50}$ hydrocarbon radical which may be linear, branched or cyclic and may contain one or more non-carbon atoms in the carbon-chain and each X being a halogen.

5. A process according to claim 1, comprising polymerizing isobutene and isoprene and optionally further copolymerizable monomers.

6. A process according to claim 1, wherein said process is a slurry polymerization.

* * * * *